Sept. 18, 1928.

M. C. GILLIES 1,684,986

OVERHEAD RUNWAY TURNTABLE

Filed Feb. 2, 1927      3 Sheets-Sheet 1

Inventor
Matthew Chalmers Gillies
By Adam E. Fisher
Attorney

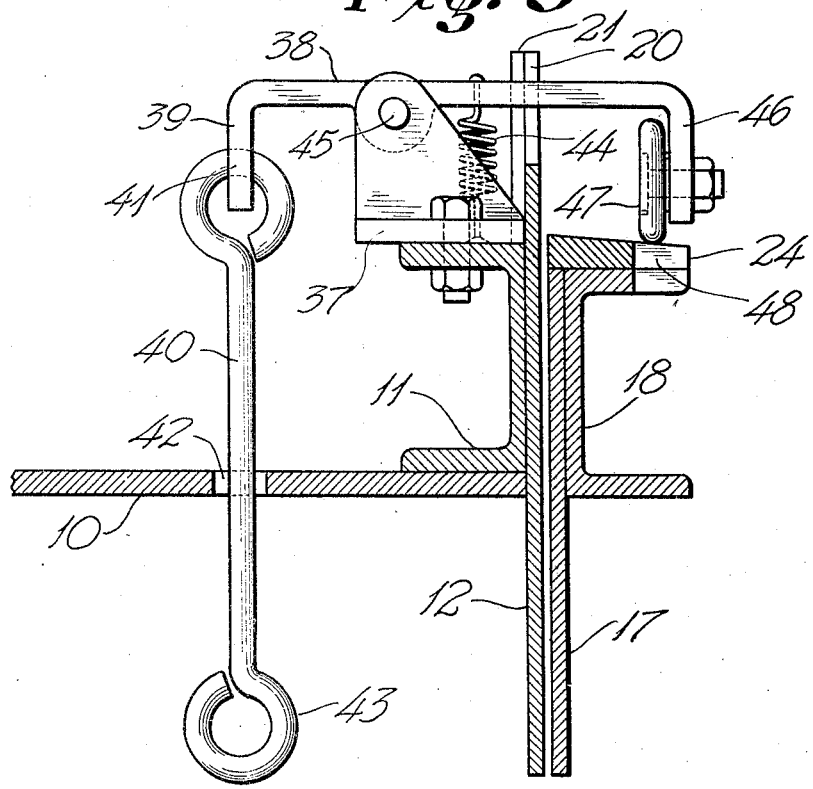
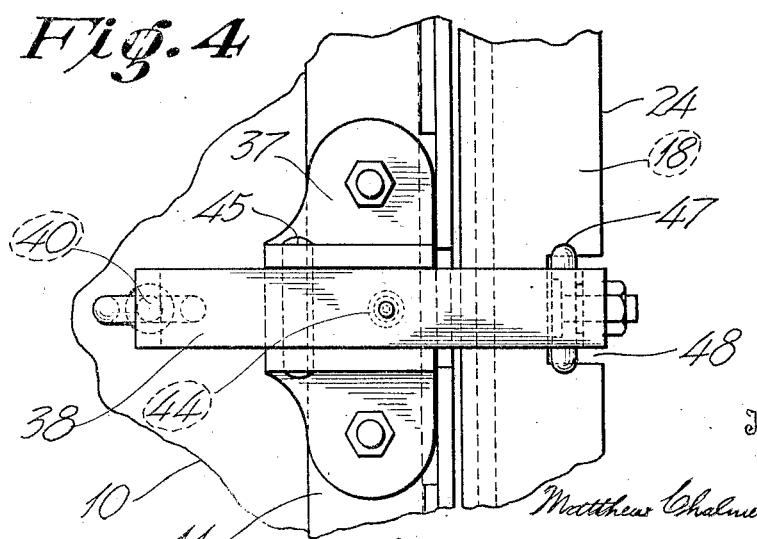

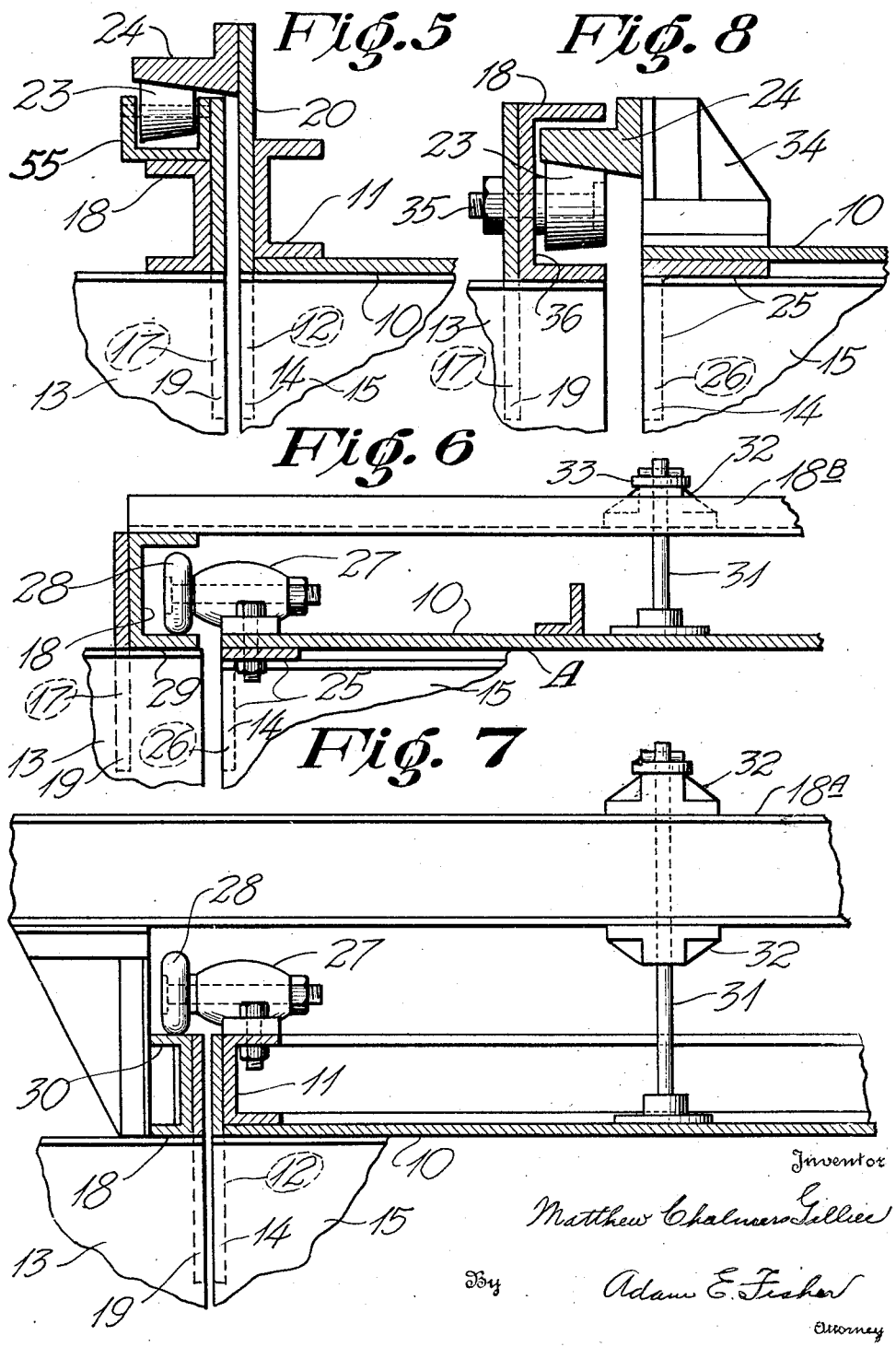

Patented Sept. 18, 1928.

1,684,986

UNITED STATES PATENT OFFICE.

MATTHEW CHALMERS GILLIES, OF WALKERVILLE, ONTARIO, CANADA.

OVERHEAD RUNWAY TURNTABLE.

Application filed February 2, 1927. Serial No. 165,279½.

My invention relates to improvements in overhead runway turntables, and has for one object to provide such a turntable in which the supporting means also acts to guide the turntable.

Another object of my invention is to provide a means whereby the cranes or carriages traveling on the runway system will be prevented from overrunning the ends of the runway joists when the turntable is not aligned with the said joists.

Another object of my invention is to provide a means whereby the turntable may be exactly aligned with the runway joists as desired in a very simple and efficient manner.

With the above and other objects in view, my invention consists in the combination and arrangement of parts hereinafter described and claimed, it being understood that, within the scope of what is claimed, changes may be made in the precise embodiment shown without departing from the spirit of the invention.

In the drawings:

Figure 3 is an elevation, partly in section, of the automatic stop apparatus.

Figure 4 is a plan view of Figure 3.

Figure 5 is an enlarged sectional view of a part of Figure 1 showing a modification thereof in which the tapered ring is reversed in position and attached to the turntable.

Figure 6 is an enlarged sectional view of a part of Figure 1 showing a modification thereof in which an angle is used on the circular plate of the turntable and cylindrical rollers are used.

Figure 7 is an enlarged sectional view of a part of Figure 1 showing a modification thereof in which cylindrical rollers are used instead of tapered rollers.

Figure 8 is an enlarged sectional view of a part of Figure 1 showing a modification thereof in which an angle is used on the circular plate of the turntable and the tapered ring is reversed in position and attached to the turntable.

Figure 2:
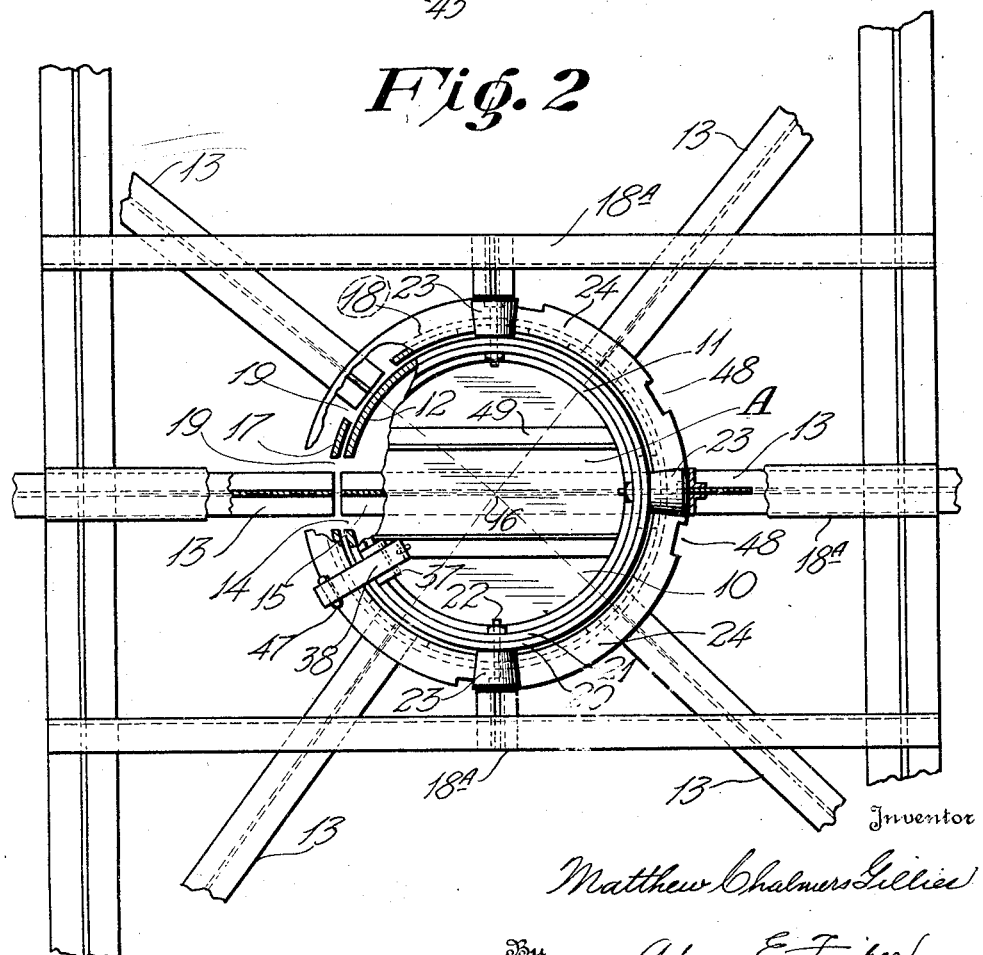
Figure 2 is a plan view of Figure 1.

In the drawings is shown an overhead runway and its supports. Usually, there are several runways provided in such an installation, and the different runways are connected with one another by means of point switches. In the present invention, means are provided whereby the point switches are dispensed with, and in their place is provided a circular turntable, indicated generally by A and composed of a circular steel plate 10, riveted to the lower flange of the channel 11, the said channel being bent into the form of a circular ring with its flanges turned inwardly as shown in Figure 2. A depending plate 12 is riveted to the outside of the web of the aforesaid channel 11, so as to form a guard whereby carriages on the runway joists 13 are prevented from overrunning the ends of the said joists when the turntable is not in alignment with them. Openings as at 14 are provided in the aforesaid plate 12, corresponding to the ends of the portion of the runway joist 15, which is attached to the turntable A, and adapted to form a prolongation of the runway joists 13 when in alignment with any of them. If desired, steel angles or channels, as at 49, may be used to strengthen the plate 12.

Figure 1:
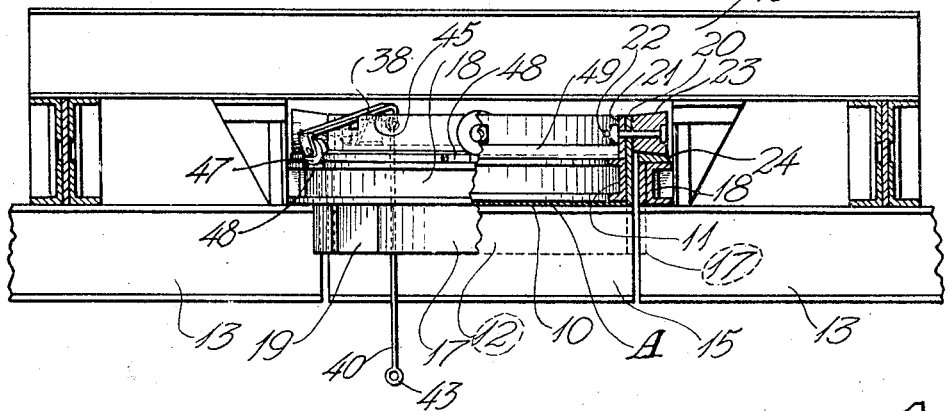
Figure 1 is a sectional view of my invention, showing the tapered rollers and ring, guide plates and automatic stop.

In the embodiment of my invention shown in Figures 1 and 2, six runway joists 13 are shown radiating to a common center as at 16, and a turntable A is mounted so as to rotate about the said common center 16. A depending plate 17 is riveted to the channel 18 attached to the supporting framework 18ᴬ, adjacent to the ends of the said runway joists 13, so as to form a circular ring within which the said turntable A is adapted to rotate. Openings 19 are provided in the said plate 17 corresponding to the ends of the runways 13, but the plate is left solid between the said runway joists, whereby a carriage (not shown) on the runway joists 15 attached to the said turntable A will be prevented from overrunning the ends of the said runway joist 15.

When the joists 13 and 15 are not in alignment, it is obvious that by the provision of the depending guard plates 12 and 17, and the openings, as at 14 and 19, that are provided in the said plates, I have made the use of the turntable A secure against accidental overruns of the carriages (not shown) which are adapted to use the runway system.

In the embodiment shown in Figures 1 and 2, I employ a means for rotatably centering the turntable about the common center 16 of the radiating runways 13 best described as follows: The depending plate 12 riveted to the channel 11 is extended above the said channel a sufficient distance, as shown at 20, and reinforced on the inside with a flat circular ring 21 riveted to the said plate 12, and a plurality of horizontally extending pins 22 are positioned on the said plate extension 20 and extending outwardly therefrom. Tapered rollers 23 are revolvably mounted on the said pins 22. The prolongation of the faces of the said tapered rollers meet at the locus of the said common point 16. A tapered circular ring 24 is positioned on the supporting channel 18, and the prolongation of the face of the said ring 24 passes through the aforesaid locus of the common point 16, whereby the said tapered rollers 23 are adapted to roll over the said tapered ring 24 thus supporting the weight of the turntable and any carriage thereon without any sliding friction, and at the same time the action of the aforesaid tapered rollers coacting with the said tapered ring will tend to cause the said turntable A to rotate about the said common point 16 as a center. It is obvious that in this manner I have eliminated the necessity of a pivot pin or the like, and at the same time I have eliminated the loss of power due to sliding friction, such as would be generated by the use of a cylindrical roller and a pivot pin, or by a flanged cylindrical roller as heretofore used.

In Figure 5 is shown a modification of my invention, wherein the tapered circular ring 24 is reversed in position and attached to the said plate extension 20, while the rollers 23 are revolvably mounted in a circular frame 55 positioned on the aforesaid supporting channel 18. In this modification the action of the rollers and tapered ring is the same as heretofore described.

In Figure 6 is shown a modification of my invention wherein the channel 11 and depending plate 12 as heretofore described are dispensed with; an angle 25 is riveted to the underside of the aforesaid circular plate 10, with the free leg 26 of the said angle depending from the said plate so as to act in the same manner as the aforesaid plate 12, and openings 14 are provided in the said leg 26 of the angle for the purpose as heretofore described. A plurality of brackets 27 are positioned around the periphery of the said circular plate 10, having cylindrical rollers 28 revolvably mounted on the said brackets; the said rollers 28 are adapted to roll upon the inside of the lower flange 29 of the aforesaid supporting channel 18, which is turned so as to face inwardly for this purpose, as shown in the figure. The turntable A, in the modification shown, is pivotally mounted on the frame 18^B positioned on the channel 18 as by means of the pin 31 journaled in the bearing 32 mounted on the aforesaid frame 18^B. A collar 33 is provided on the said pin 31, and adapted to engage the aforesaid bearing 32.

In the modification shown in Figure 7, a construction similar to that shown in Figures 1 and 2 is used, but the plate 12 does not extend above the top of the channel 11. Brackets 27 are mounted directly on the aforesaid channel 11, and rollers 28 are revolvably mounted on the said brackets; the said rollers 28 are adapted to roll on the top flange 30 of the aforesaid channel 18.

The weight of the turntable A and any carriage (not shown) that may be thereupon, is carried by the pin 31 to the supporting framework 18^A in the manner as described and shown in Figure 6; and the turntable A is pivotably mounted on the said frame work 18^A by means of the pin 31 in a similar manner as described and shown in Figure 6.

In the modification shown in Figure 8, the channel 11 and depending plate 12 as heretofore described are dispensed with; and an angle 25 is riveted to the underside of the aforesaid circular plate 10, with the free leg 26 of the said angle depending from the said plate so as to act in the same manner as the aforesaid plate 12, and openings 14 are provided in the said leg 26 of the angle for the purpose as heretofore described. A plurality of brackets 34 are provided and positioned around the periphery of the said circular plate 10, and the tapered circular ring 24 is reversed in position, so as to have the tapered face thereof facing downwardly and mounted on the said brackets 34; tapered rollers 23 as heretofore described are revolvably mounted on inwardly and horizontally extending pins 35 positioned on the web 36 of the aforesaid channel 18. By this means I protect the revolving parts of the turntable from dust and dirt.

In Figures 3 and 4 is shown the automatic stop apparatus whereby the runway joist 15 positioned on the turntable A may be exactly aligned with any one of the runway joists 13 aforesaid, so that a carriage (not shown) may be run off the joist 13 onto the runway joist 15 of the turntable. A bracket 37 is positioned on the channel 11 at any suitable place; a radially and horizontally extending lever 38 is pivoted intermediate the said lever on the said bracket as by the pin 45; a depending finger 39 is provided the inner end of the lever, and a rod 40 is linked to the said finger 39 as shown at 41; the said rod 40 passes through the plate 10 as at 42, and terminates in an eye 43, whereby the said rod may be caught by a hooked pole or the like. A spring 44 is attached to the lever 38 outwardly the pin 45, and adapted to cause the outer end of the said lever 38 to move downwardly; a depending finger 46 is provided at the outer end of the aforesaid lever 38; and a roller 47 is revolvably mounted on the said finger 46 and adapted to roll upon the top flange of the aforesaid channel 18. Notches 48 are provided in the said channel 18 suitably to correspond to the number and position of the aforesaid runway joists 13; and the roller 47 is caused to engage the notches 48 under the influence of the spring 44 whereby the turntable A will be positioned in exact alignment with the desired one of the aforesaid runway joists 13. When it is desired to turn the turntable to align with another joist, a pull is given to the rod 40 by any convenient means, whereby the lever 38 is caused to pivot about the pin 45, thereby lifting the roller 47 out of engagement with the notch 48; whereupon the said turntable may then be rotated to alignment with some other joist, as desired.

It is obvious that by the foregoing construction I have eliminated the possibility of the turntable moving whilst a carriage (not shown) may be moving on or off the turntable, thereby greatly promoting the safety of the device.

I claim:

1. In an overhead runway system, the combination with runway joists intersecting at a common point and a supporting frame for the said joists of a turntable adapted to rotate about the said common point, the said turntable comprising a circular plate; a channel formed into a circular ring with its flanges turned inwardly fastened to the said plates; a tapered ring mounted on the said supporting frame; a plurality of tapered rollers revolvably mounted on the said turntable and adapted to roll on the said tapered ring; a joist mounted on the said turntable adapted to be aligned with one of the said runway joists; and means for releasably locking the said turntable in any desired alignment.

2. In a overhead runway system, the combination with runway joists intersecting at a common point and a supporting frame for the said joists of a turntable adapted to rotate about the said common point, the said turntable comprising a circular plate; a channel formed into a circular ring with its flanges turned inwardly fastened to the said plate; a tapered ring mounted on the said supporting frame; a plurality of tapered rollers revolvably mounted on the said turntable and adapted to roll on the said tapered ring; a turntable joist mounted on the said turntable and adapted to be aligned with one of the said runway joists; a dependent guard plate formed into a circular ring and fastened to the web of the said channel and having openings corresponding to the ends of the said turntable joists; a runway guard plate formed into a circular ring and fastened to the said supporting frame wherein the said turntable is adapted to rotate and having openings corresponding to the said runway joists; and means for releasably locking the said turntable in any desired alignment.

3. In an overhead runway system, the combination with runway joists intersecting at a common point and a supporting frame for the said joists, of a turntable adapted to rotate about the said common point, the said turntable comprising a circular plate; a stiffening channel formed into a circular ring with its flanges turned inwardly fastened to the said plate; a dependent guard plate formed into a circular ring and fastened to the web of the said channel so as to have a portion thereof extending above the said channel; a tapered ring mounted on the said supporting frame; a plurality of tapered rollers revolvably mounted on the said portion of the guard plate extending above the channel and adapted to roll on the said tapered ring; a turntable joist mounted on the said turntable and adapted to be aligned with one of the said runway joists; said guard plate having openings corresponding to the ends of the said turntable joist; a supporting channel bent into the form of a circle and positioned on the said supporting framework concentrically with the said turntable; a runway guard plate formed into a circular ring and fastened to the said supporting channel wherein the said turntable is adapted to rotate; said runway guard plate having openings corresponding to the said runway joists; a bracket positioned on the top flange of the said stiffening channel; a spring set radially extending lever pivoted mediately itself on the said bracket; an indexing roller revolvably mounted on the outer end of the said lever and adapted to roll on the top flange of the said supporting channel; the top flange of the said supporting channel having notches corresponding to the position and number of the said runway joists; whereby the said indexing roller is adapted to engage one of the said notches so as to releasably lock the said turntable in any desired alignment with the said runway joists.

4. In an overhead runway system, the combination with runway joists intersecting at a common point and a supporting frame for the said joists, of a turntable adapted to rotate about the said common point, the said turntable comprising a circular plate; a stiffening angle fastened to the said plate; the free leg of the said stiffening angle depending from the said plate so as to form a guard; a turntable joist fastened to the lower side of the said circular plate; the said turntable joist being adapted to be aligned with one of the said runway joists; the dependent leg of the said angle having openings to correspond to the ends of the said turntable joist; a supporting channel bent into the form of a circle with its flanges turned inwardly and positioned on the said supporting framework concentrically with the said turntable; a runway guard plate formed into a circular ring and dependent from said supporting channel wherein the said turntable is adapted to rotate and having openings corresponding to the said runway joists; a plurality of horizontally and inwardly extending tapered rollers mounted on the web of the said supporting channel; a tapered ring mounted above and in spaced relation to the said circular plate so as to extend outwardly therefrom and further adapted to be rotatably supported and guided by the said tapered rolls; a spring set radially extending lever pivotably mounted on the said turntable; said supporting channel having a plurality of notches corresponding in position and number with the said runway joists; an indexing roller revolvably mounted on the said lever and adapted to engage the said notches whereby the said turntable may be releasably locked in any desired alignment with the said runway joists; and means for causing the pivoting of the said lever whereby the said roller may be caused to disengage the said notch.

5. In an overhead runway system, the combination with a supporting frame and runway joists dependent therefrom and intersecting at a common point, of a tapered ring mounted on said supporting frame, a plurality of revolvable tapered rollers co-operatively engaging said ring for rolling action thereon, and a joist dependent from said rollers adapted to be alined with any one of said runway joists.

In testimony whereof I affix my signature.

MATTHEW CHALMERS GILLIES.